(12) United States Patent
Mirmobin

(10) Patent No.: US 6,628,024 B1
(45) Date of Patent: Sep. 30, 2003

(54) HERMETICALLY SEALED FEED-THROUGH ASSEMBLY FOR GAS TURBINE ENGINE STARTER GENERATORS AND RELATED METHODS

(75) Inventor: Parsa Mirmobin, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/208,388

(22) Filed: Jul. 30, 2002

(51) Int. Cl.$^7$ .................. H02K 5/22; H01B 17/26
(52) U.S. Cl. .............. 310/71; 174/151; 174/152 R
(58) Field of Search ............... 310/71; 174/153 G, 174/153 GM, 151, 152 R

(56) References Cited

U.S. PATENT DOCUMENTS

| | | | |
|---|---|---|---|
| 2,487,328 A | | 11/1949 | George et al. |
| 2,531,719 A | | 11/1950 | Alvino |
| 3,134,230 A | * | 5/1964 | Lynch ................. 174/151 |
| 3,283,186 A | | 11/1966 | Perry |
| 3,352,963 A | * | 11/1967 | Homrig ................ 174/151 |
| 3,435,128 A | * | 3/1969 | Dorwald ............... 174/151 |
| 3,739,323 A | | 6/1973 | Spors |
| 4,174,145 A | * | 11/1979 | Oeschger et al. ........ 439/589 |
| 4,213,004 A | * | 7/1980 | Acker et al. ........... 174/151 |
| 4,251,680 A | * | 2/1981 | Germann .............. 174/18 |
| 4,493,378 A | * | 1/1985 | Kyle ................ 174/152 GM |
| 4,530,674 A | | 7/1985 | Rauch |
| 4,712,029 A | | 12/1987 | Nold |
| 4,806,807 A | | 2/1989 | Levino |
| 4,894,575 A | | 1/1990 | Nilsson et al. |
| 4,895,470 A | | 1/1990 | Scherzinger |
| 4,942,944 A | | 7/1990 | Frey et al. |
| 4,943,746 A | | 7/1990 | Scherzinger et al. |
| 4,959,572 A | | 9/1990 | Becker |
| 5,012,146 A | | 4/1991 | Tumpey |
| 5,013,948 A | | 5/1991 | Tumpey et al. |
| 5,063,314 A | | 11/1991 | DeSantis |
| 5,122,696 A | | 6/1992 | Shih et al. |
| 5,191,254 A | | 3/1993 | Raad et al. |
| 5,194,697 A | * | 3/1993 | Hegner et al. ............ 174/151 |
| 5,196,752 A | | 3/1993 | Palma |
| 5,227,587 A | * | 7/1993 | Paterek ............. 174/152 GM |
| 5,264,816 A | | 11/1993 | Degenhart et al. |
| 5,332,939 A | | 7/1994 | Fanning et al. |
| 5,382,856 A | | 1/1995 | Keck et al. |
| 5,500,563 A | | 3/1996 | Kawaguchi et al. |
| 5,698,923 A | | 12/1997 | Scherzinger et al. |
| 6,100,809 A | | 8/2000 | Novoselsky et al. |
| 6,113,024 A | | 9/2000 | Pittard et al. |
| 6,121,709 A | | 9/2000 | Fathimulla et al. |
| 6,122,817 A | | 9/2000 | Meacham et al. |
| 6,124,655 A | | 9/2000 | Jeske |
| 6,225,718 B1 | | 5/2001 | Kamei et al. |
| 6,278,206 B1 | | 8/2001 | Yockey et al. |
| 6,300,698 B1 | | 10/2001 | Fargo et al. |
| 6,515,232 B2 | * | 2/2003 | Forster ................ 174/152 R |

* cited by examiner

Primary Examiner—Burton Mullins
(74) Attorney, Agent, or Firm—Robert Desmond, Esq.

(57) ABSTRACT

A terminal assembly for rotating electrical machines, such as high speed starter-generators used for gas turbine engines in aircraft or other vehicles, is made from components that are readily assembled for ease of installation, maintenance, and repair. The terminal assembly includes a feedthrough body, an electrically conductive electrode that extends through the feedthrough body, and a hermetical seal that couples the electrode to the feedthrough body inner surface.

20 Claims, 3 Drawing Sheets

HERMETICALLY SEALED FEED-THROUGH ASSEMBLY FOR GAS TURBINE ENGINE STARTER GENERATORS AND RELATED METHODS

FIELD OF THE INVENTION

The present invention relates to rotating electrical machines such as high speed starter generators for gas turbine engines and, more particularly, to a terminal assembly used to transmit electrical energy between starter generators and external systems and equipment, and a method of assembling and installing the terminal assembly in the starter generator.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated as either a motor or a generator.

An aircraft starter-generator may include three separate brushless generators, namely, a permanent magnet generator (PMG), an exciter motor/generator, and a main motor/generator. The PMG includes permanent magnets on its rotor. When the PMG rotates, AC currents are induced in stator windings of the PMG. These AC currents are typically fed to a regulator or a control device, which in turn outputs a DC current if operating as a generator, or an AC current if operating as a motor.

If the starter-generator is operating as a generator, the DC current from the control device is supplied to stator windings of the exciter. As the rotor of the exciter rotates, three phases of AC current are typically induced in the rotor windings. Rectifier circuits that rotate with the rotor of the exciter rectify this three-phase AC current, and the resulting DC current is provided to the rotor windings of the main motor/generator. Finally, as the rotor of the main motor/generator rotates, three phases of AC current are typically induced in its stator, and this three-phase AC output can then be provided to a load such as, for example, an aircraft electrical system.

If the starter-generator is operating as a motor, the AC current form the control device is supplied to both the stator of the main motor/generator and the stator of the exciter. This AC current induces a rotating magnetic field in the main motor/generator and exciter stators, which causes the rotor to rotate and supply mechanical output power.

The electrical power output from, or supplied to, the starter-generator may be supplied from or to stator output leads, via one or more terminal assemblies. The terminal assemblies may consist of feedthroughs that extend through the generator housing, and are coupled to the stator output leads within the generator housing and to a terminal block assembly outside of the generator housing. Insulators may be used with the feedthroughs to electrically insulate the feedthroughs from the housing. When used in oil-cooled generators, seals may additionally be used to provide a sufficiently leak-tight seal around the feedthroughs.

In some cases, the feedthroughs are coupled to the stator output leads and the terminal block assembly by a relatively high temperature brazing process. During this process, the insulators and seals may be protected with one or more heat sinks to reduce the likelihood of component degradation and/or failure from exposure to the heat. Thus, some feedthroughs are relatively large in size in order to allow an effective connection to a heat sink during the brazing process. Even with heat sinks installed during the brazing process, the insulators and seals are still damaged in some instances and are replaced. Moreover, after the feedthroughs are installed, various testing may still have to be performed to verify proper electrical and mechanical performance, which can increase costs. In addition, repairing feedthroughs installed in this manner can be time consuming and complex, thereby increasing repair costs.

Hence, there is a need for a terminal assembly that addresses one or more of the above-noted drawbacks. Namely, a terminal assembly and installation method that does not result in significant component damage or failure during installation, and/or does not require significant amounts of verification testing after installation, and/or allows for comparatively easy and less time consuming repairs, and is therefore less costly as compared to present assemblies. The present invention addresses one or more of these needs.

SUMMARY OF THE INVENTION

The present invention provides a terminal assembly for electrical machines, such as high speed aircraft starter-generators, that does not result in significant component damage or failure during installation, is relatively simple in design, is relatively inexpensive, and is relatively easy to install.

In one embodiment of the present invention, and by way of example only, a starter-generator for a gas turbine engine includes a housing, a stator, a rotor, and a terminal assembly. The stator is mounted within the housing, and the rotor is rotationally mounted within the stator. The terminal assembly is mounted on the housing and includes a feedthrough body, at least one electrically conductive electrode, and a hermetic seal. The feedthrough body has an outer surface and an opening therethrough forming an inner surface. Each electrically conductive electrode extends through the opening in the feedthrough body, and the hermetic seal coupes the electrode to the feedthrough body inner surface.

In yet another exemplary embodiment, a terminal assembly for electrically connecting a stator mounted within the housing of an electrical machine to external equipment and systems includes a terminal housing, a feedthrough body, at least one electrically conductive electrode, and a hermetic seal. The terminal housing is adapted for coupling to the machine housing. The feedthrough body has an outer surface and an opening therethrough forming an inner surface. Each electrically conductive electrode extends through the opening in the feedthrough body, and the hermetic seal coupes the electrode to the feedthrough body inner surface.

In still another exemplary embodiment, an electrical feedthrough assembly for electrically connecting a stator housed within an electrical machine to external systems and equipment includes a feedthrough body, at least one electrically conductive electrode, and a hermetic seal. The terminal housing is adapted for coupling to the machine housing. The feedthrough body has an outer surface and an opening therethrough forming an inner surface. Each electrically conductive electrode extends through the opening in the feedthrough body, and the hermetic seal coupes the electrode to the feedthrough body inner surface.

In yet still another exemplary embodiment, a method of assembling a terminal assembly for a rotating electrical machine housing includes providing a feedthrough body having an outer surface and an opening therethrough forming an inner surface, inserting at least one electrically conductive electrode into the feedthrough body and through the opening therein, and coupling the electrode to the feedthrough body inner surface with a hermetic seal.

Other independent features and advantages of the preferred terminal assembly and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) motor/generator, it will be appreciated that it can be implemented in other AC motor/generator designs needed in specific applications.

Figure 1:
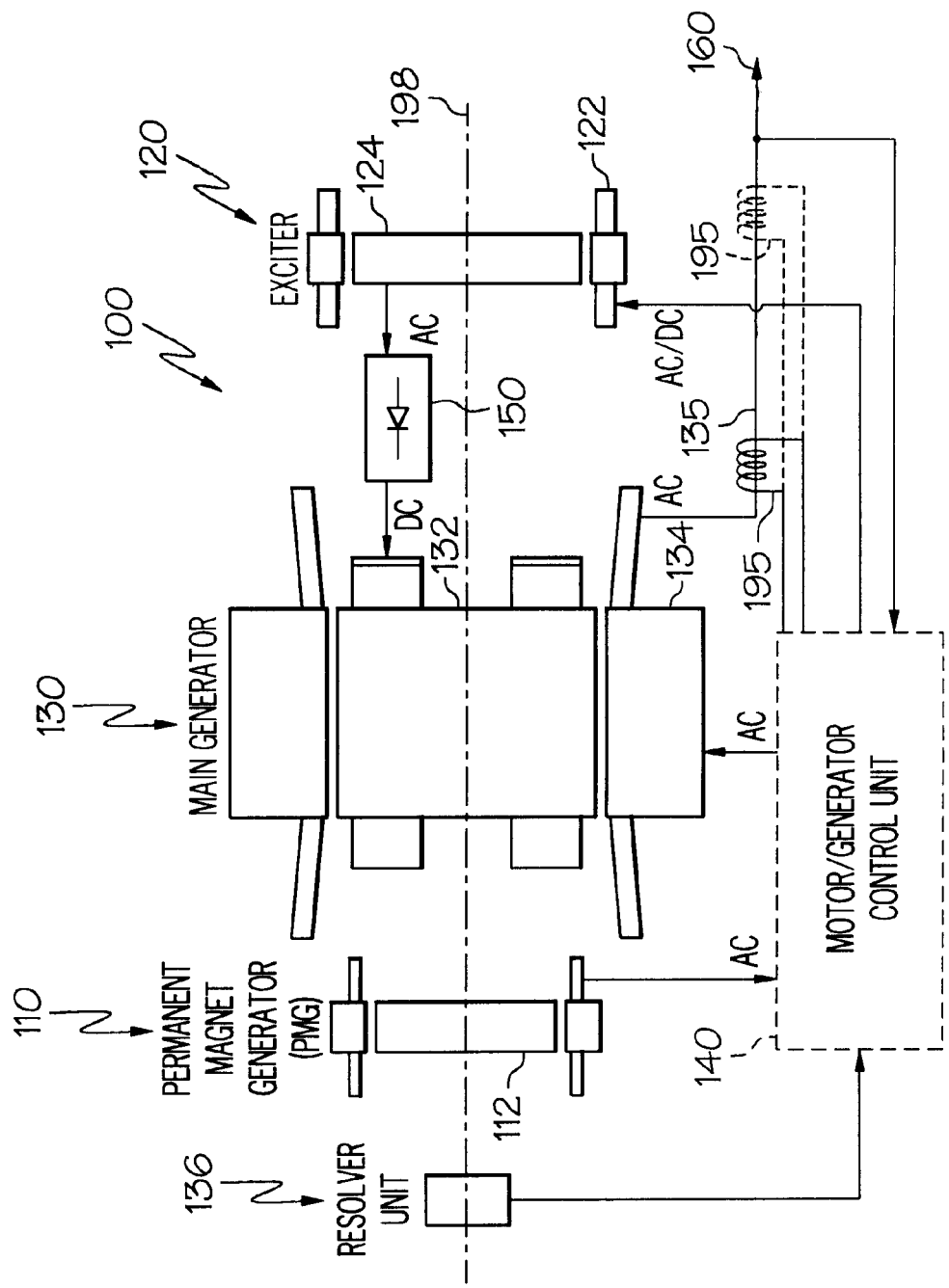
FIG. 1 is a functional schematic block diagram of an exemplary high speed starter-generator system according to an embodiment of the invention.

Turning now to the description, and with reference first to FIG. 1, a functional schematic block diagram of one embodiment of a high speed motor/generator system 100 is shown. This exemplary motor/generator system 100, which is commonly known as a brushless AC motor/generator, includes a permanent magnet generator (PMG) 110, an exciter 120, a main motor/generator 130, a motor/generator control unit 140, and one or more a rectifier assemblies 150. It is noted that the motor/generator system 100 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating as a generator, a rotor 112 of the PMG 110, a rotor 124 of the exciter 120, and a rotor 132 of the main motor/generator 130 all rotate. As the PMG rotor 112 rotates, the PMG 110 generates and supplies AC power to the motor/generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main motor/generator rotor 132, which in turn outputs AC power from a main motor/generator stator 134.

During its operation as a generator, the motor/generator system 100 is capable of supplying output power at a variety of frequencies. Alternatively, a gearing system may be used to operate the motor/generator at a constant speed and, thus, supply a constant frequency. The output power from the main motor/generator stator 134 is typically three-phase AC power. One or more stator output leads 135 supplies the generated AC power to external systems and equipment via one or more terminal assemblies 160, which are discussed in more detail below. The motor/generator control unit 140 can regulate the power output based upon monitoring signals provided to it from monitoring devices 195. In the depicted embodiment, the PMG 110, the exciter 120, and the main motor/generator 130 all rotate along a single axis 198 at the same rotational speed. It will be appreciated, however, that in other embodiments the PMG 110 may rotate along a different axis. Moreover, the relative positioning of the PMG 110, the exciter 120, and the main motor/generator 130 can be modified in different embodiments such that the exciter 120 is physically between the PMG 110 and the main motor/generator 130.

When the motor/generator system 100 is operating as a motor, AC power is supplied to the exciter stator 122 and the main motor/generator stator 134 from, for example, an AC power supply section (discussed below) in the motor/generator control unit 140, causing the main motor/generator rotor 132 to rotate. As the main motor/generator rotor 132 rotates, the PMG 110 and exciter 120 also rotate. A position sensing device, such as a resolver unit 136, may also be included in the system 100 to supply a signal representative of the main motor/generator rotor 132 position to the motor/generator control unit 140. This position signal is used to control the AC power supplied to the main motor/generator stator 134 and to the exciter such that the maximum torque is generated. It will be appreciated, however, that the resolver unit 136 need not be included in the motor/generator system 100. Instead, the position signal may be produced using a sensorless method, in which the position is derived from various electrical signals in the motor/generator system 100.

Figure 2:
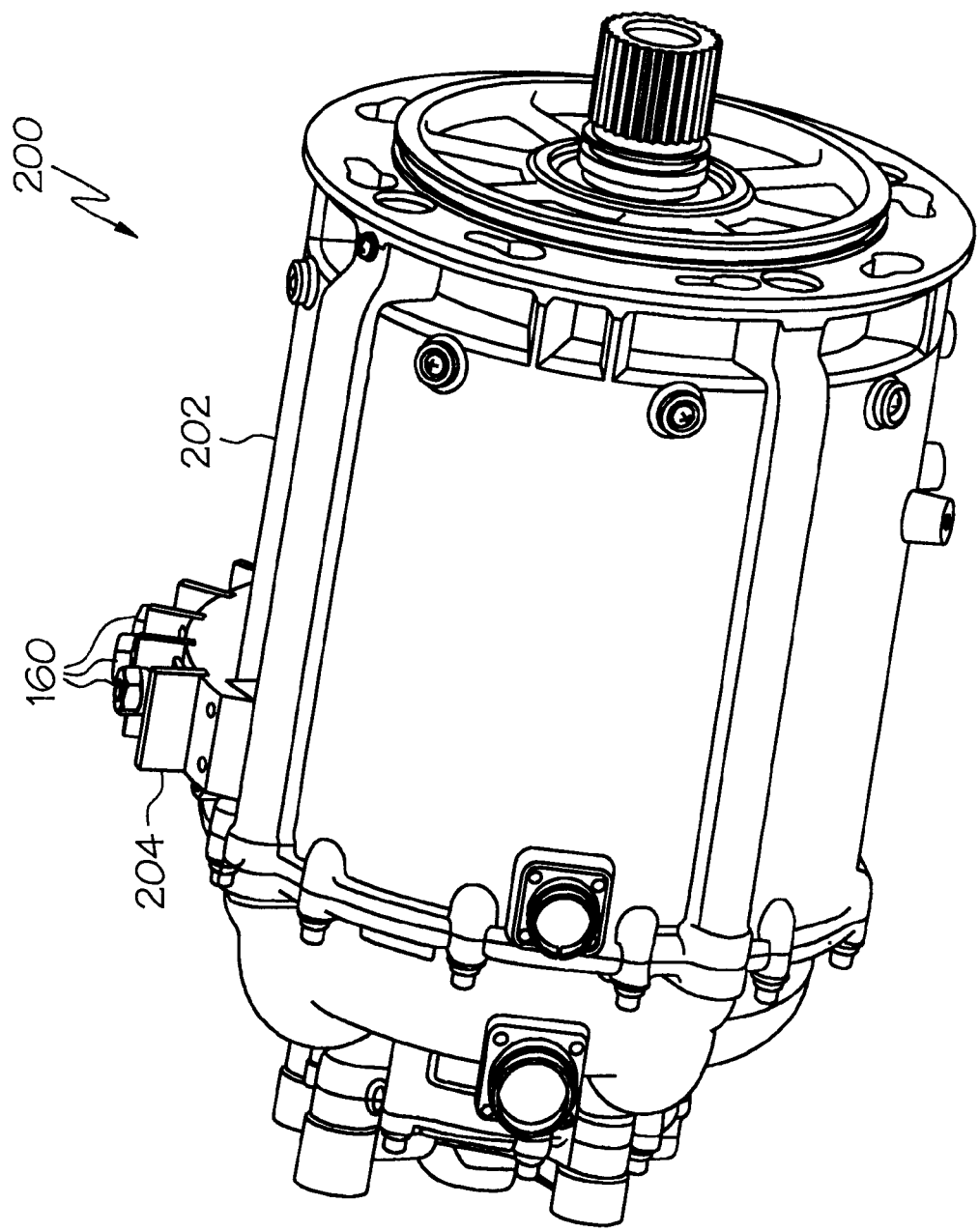
FIG. 2 is a perspective view of a physical embodiment of the starter-generator system depicted in FIG. 1.

The motor/generator system 100, or at least portions of the system 100, may be housed within a generator housing 202, a perspective view of which is illustrated in FIG. 2. The generator housing 202 includes a terminal housing section 204. This terminal housing section 204 may be an integral part of the generator housing 202 itself, or may be a separate part that is mounted to the generator housing 202. In either case, the terminal housing section 204 provides the electrical interface to external equipment and systems. In particular, one or more of the terminal assemblies 160 are each mounted to the generator housing 202 in the terminal housing section 204 and provide the electrical interface. A particular embodiment of the terminal assembly 160 used in the motor/generator system 100 will now be provided.

Figure 3:
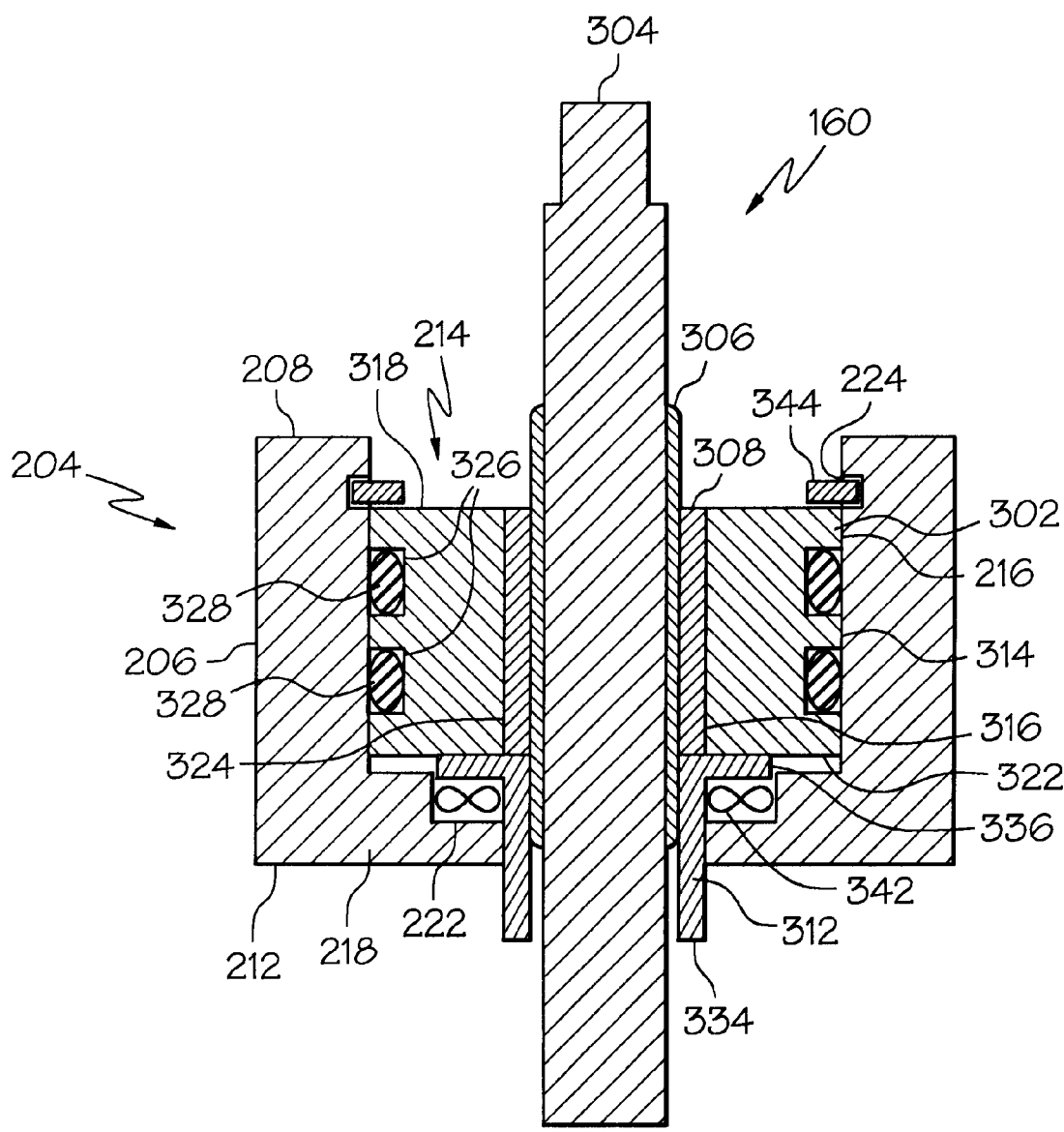
FIG. 3 is a cross-section view of a terminal assembly according to an embodiment of the present invention that may be used in the starter-generator depicted in FIGS. 1 and 2.

Turning to FIG. 3, the terminal assembly 160 includes a feedthrough body 302, an electrode 304, a sleeve 306, a hermetic seal 308, and an insulator 312, all housed within the terminal housing section 204 of the generator housing 202. The terminal housing section 204 includes an outer surface 206, a top surface 208, a bottom surface 212, and an opening 214 extending through the terminal housing 204 between the top 208 and bottom 212 surfaces to form an inner surface 216. The inner surface 216 includes an inwardly extending flange section 218 near the bottom surface 212, which narrows the opening 214 as it extends through the bottom surface 212. In the depicted embodiment, a support ledge 222 is formed on the inwardly extending flange section 218. In addition, a groove 224 is formed on the inner surface 216 near the terminal housing section top surface 208, the purpose of both the support ledge 222 and groove 224 are discussed below.

The feedthrough body 302 is inserted into the terminal housing section opening 214 and includes an outer surface 314, and an opening 316 extending through the body 302 between a top surface 318 and a bottom surface 322, which forms an inner surface 324. Two O-ring grooves 326 are formed in the feedthrough body outer surface 314. An O-ring seal 328 is positioned around the feedthrough body outer surface 314 and in each of the O-ring grooves 326. The O-ring seals 328 contact the terminal housing section inner surface 216 and provide a leak tight seal between the inside and outside of the generator housing 202 for the oil contained within the generator housing 202. It should be appreciated that the feedthrough body outer surface 314 may include only a single O-ring groove 326, or more than two O-ring grooves 326. It should additionally be appreciated that the feedthrough body 302 may be formed of any one of numerous metallic or non-metallic materials. In a preferred embodiment, however, the feedthrough body 302 is formed of stainless steel.

The electrode 304 extends through the opening 316 in the feedthrough body 302, and is used to electrically couple the motor/generator system 100 to external equipment and systems. In the depicted embodiment, the sleeve 306 surrounds at least a portion of, and is coupled to, the electrode 304. In a preferred embodiment, the sleeve 306 is coupled to the electrode 304 by a brazing process, though it will be appreciated that other coupling methods including, for example, threaded coupling, may additionally be used. The sleeve 306, in turn, is coupled in leak-tight fashion to the feedthrough body inner surface 324 by the hermetic seal 308 by, for example, fusing the sleeve 306 and hermetic seal 308 together. The hermetic seal 308 may be formed of glass, ceramic or various other suitable materials, but is preferably formed of glass.

It should be appreciated that the sleeve 306 may be omitted from the terminal assembly 160, depending on the machine into which the terminal assembly 160 is installed. In addition, it should be appreciated that the materials of which the electrode 304 and sleeve 306 are formed may also depend on the terminal assembly 160 end-use environment. For example, when the terminal assembly 160 is used in a low voltage-high current motor, generator, or motor/generator application, the electrode 304 is preferably formed of a material having a relatively high conductivity, such as copper. It is known that copper and various other suitable high conductivity materials have relatively high coefficients of thermal expansion. Similarly, many materials that have relatively low coefficients of thermal expansion do not have sufficiently high conductivities for high current applications (e.g., up to 600 amps). Thus, the sleeve 306 is preferably used when the terminal assembly 160 is used in high current applications, and is preferably formed of a material having a relatively low coefficient of thermal expansion such as, for example, AISI E 5200 steel alloy. As a result, should the electrode 304 thermally expand, the likelihood that the hermetic seal 308 is cracked or otherwise damaged is reduced. For relatively low current applications, where a low conductivity material may be used, and/or where thermal expansion is not a concern, the sleeve 306 may be omitted and/or the electrode 304 may be formed of other materials that are suitably conductive for the machine rating.

As previously noted, the feedthrough body 302 is positioned within the terminal housing section 204 of the generator housing 202, and the electrode 304 extends through the terminal housing section opening 214 and into the generator housing 202. Thus, the insulator 312 is provided to electrically isolate the electrode 304 from the generator housing 202. The insulator 312 includes a longitudinally configured elongate section 334 and a flange section 336 that extends radially from the elongate section 334. The elongate section 334 surrounds a portion of the sleeve 306, if installed, and a portion of the electrode 304, and extends through the terminal housing section opening 214 and into the generator housing 202. The insulator flange section 336 has an upper surface that abuts the feedthrough main body bottom surface 322, insulating the feedthrough body 302 from the terminal housing section 204. At least one spring washer 344 may be positioned within the terminal housing section 204 on the support ledge 222, and abuts a bottom surface of the insulator flange section 338. The spring washer 342 thus exerts an upward force against the feedthrough body 302, via the insulator flange section 338. It should be appreciated that the spring washer 342 may be omitted from the terminal assembly 160.

A retaining ring 344 is fitted into the terminal housing section groove 224. The retaining ring 344 contacts the feedthrough body top surface 318 and secures the feedthrough body 302 within the terminal housing section opening 214. It should be appreciated that although the insulator 212 is depicted as a separate piece, it could be formed integrally with either the electrode 304 or the sleeve 306. It should be further appreciated that the insulator 312 may be formed of any one of numerous known insulating materials known in the art. In a preferred embodiment, it is formed of a polyamide material.

Having described the terminal assembly 160 from a structural standpoint, a method of assembling and installing a single terminal assembly 160 into the terminal housing section 204 of an electrical machine, such as the motor/generator system 100, will now be described. It should be appreciated that the described method need not be performed in the order in which it is described, but that this description is merely exemplary of one method of assembling and installing the terminal assembly 160.

The sleeve 306, if used, is coupled to the electrode 304 by, for example, a brazing process. The sleeve 306 is then bonded to the feedthrough body inner surface 324 by the hermetic seal 308. The two O-rings 328 are then inserted into the O-ring grooves 326 formed in the feedthrough body outer surface 314. The spring washer 342, if used, is inserted onto the terminal housing section support ledge 222, and the insulator 312 is positioned within the terminal housing section 204 such that the elongate section 334 extends through the opening 214 in the terminal housing section bottom surface 212 and the flange section 336 rests atop the spring washer 342. The feedthrough body 302 is then inserted into the terminal housing section opening 214, and the retaining ring 344 is inserted into the terminal housing section groove 224. The stator output leads 135 are coupled to the electrode 304 using, for example, a brazing process.

The terminal assembly 160 is relatively easy to install. Additionally, any brazing or other heat generating operations that are used to assemble and/or install the terminal assembly 160 are done prior to the installation and/or assembly of heat sensitive components. Thus, these heat sensitive components are not exposed to the high temperature brazing, or other, processes. Thus it is relatively reliable and less costly to install as compared to other terminal assemblies. The terminal assembly also allows for relatively quick, easy, and inexpensive modifications and repairs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An starter-generator for a gas turbine engine, comprising:
   a housing;
   a stator mounted within the housing;
   a rotor rotationally mounted at least partially within the stator; and
   a terminal assembly mounted on the housing, the terminal assembly including:
      a feedthrough body having an outer surface and an opening therethrough forming an inner surface,
      at least one electrically conductive electrode extending through the opening in the feedthrough body, a hermetic seal coupled to the feedthrough body inner surface, and a sleeve coupled between the electrode and the hermetic seal, wherein the electrode has a coefficient of thermal expansion larger than the hermetic seal and the sleeve.

2. The starter-generator of claim 1, further comprising:

an insulator surrounding at least a portion of the electrode, the insulator electrically insulating the electrode from the generator housing.

3. The starter-generator of claim 1, further comprising:

an insulator surrounding at least a portion of the sleeve, the insulator electrically insulating the electrode and the sleeve from the generator housing.

4. The starter-generator of claim 1, further comprising:

at least one seal surrounding the feedthrough body, each seal providing a substantially leak-tight seal between the feedthrough body and the generator housing.

5. The starter-generator of claim 1, further comprising:

a groove formed on an inner surface of the generator housing; and a retaining ring having at least a first portion inserted in the groove and a second portion positioned adjacent the feedthrough body.

6. The starter-generator of claim 1, further comprising:

a support ledge formed on an inner surface of the generator housing; and a spring positioned between the ledge and the feedthrough body.

7. A terminal assembly for electrically connecting a stator mounted within the housing of an electrical machine to external equipment and systems, comprising:

a terminal housing adapted for coupling to the machine housing;

a feedthrough body mounted within the terminal housing, the feedthrough body having an outer surface and an opening therethrough forming an inner surface;

at least one electrically conductive electrode extending through the opening in the feedthrough body;

a hermetic seal coupled to the feedthrough body inner surface; and a sleeve coupled between the electrode and the hermetic seal, wherein the electrode has a coefficient of thermal expansion larger than the hermetic seal and the sleeve.

8. The terminal assembly of claim 7, further comprising:

an insulator surrounding at least a portion of the electrode, the insulator electrically insulating the electrode from the machine housing.

9. The terminal assembly of claim 7, further comprising:

an insulator surrounding at least a portion of the sleeve, the insulator electrically insulating the electrode and the sleeve from the machine housing.

10. The terminal assembly of claim 7, further comprising:

at least one seal surrounding the feedthrough body, each seal providing a substantially leak-tight seal between the feedthrough body and the machine housing.

11. The terminal assembly of claim 7, further comprising:

a groove formed on an inner surface of the terminal housing; and a retaining ring having at least a first portion inserted in the groove and a second portion positioned adjacent the feedthrough body.

12. The starter-generator of claim 7, further comprising:

a support ledge formed on an inner surface of the terminal housing; and a spring positioned between the ledge and the feedthrough body.

13. An electrical feedthrough assembly for electrically connecting a stator housed within an electrical machine to external equipment and systems, comprising:

a feedthrough body having an outer surface and an opening therethrough forming an inner surface;

at least one electrically conductive electrode extending through the opening in the feedthrough body;

a hermetic seal coupled to the feedthrough body inner surface; and a sleeve coupled between the electrode and the hermetic seal, wherein the electrode has a coefficient of thermal expansion larger than the hermetic seal and the sleeve.

14. The feedthrough assembly of claim 13, further comprising:

an insulator surrounding at least a portion of the electrode.

15. The feedthrough assembly of claim 13, further comprising:

an insulator surrounding at least a portion of the sleeve.

16. The feedthrough assembly of claim 13, further comprising:

at least one seal surrounding the feedthrough body.

17. A method of assembling a terminal assembly for a rotating electrical machine housing, comprising:

providing a feedthrough body having an outer surface and an opening therethrough forming an inner surface;

inserting at least one electrically conductive electrode into the feedthrough body and through the opening therein;

coupling a hermetic seal to the feedthrough body inner surface; and coupling a sleeve between the electrode and the hermetic seal, wherein the electrode has a coefficient of thermal expansion larger than the hermetic seal and the sleeve.

18. The method of claim 17, further comprising:

surrounding at least a portion of the electrode with an insulator.

19. The method of claim 17, further comprising:

surrounding at least a portion of the sleeve with an insulator.

20. The method of claim 17, further comprising:

coupling at least one seal around the feedthrough body.

* * * * *